United States Patent [19]
Pruvot et al.

[11] 3,765,437
[45] Oct. 16, 1973

[54] HYDRAULIC FREE-JET SERVO-VALVES

[75] Inventors: Francois C. Pruvot; Michel Fayolle, both of Billancourt, France

[73] Assignee: Regie Nationale Des Usines Renault, Billancourt (Hauts de Seine), France

[22] Filed: Mar. 24, 1972

[21] Appl. No.: 237,702

[30] Foreign Application Priority Data
Mar. 31, 1971 France .............................. 7111252
Sept. 22, 1971 France .............................. 7134055

[52] U.S. Cl. .......................................... 137/83, 91/3
[51] Int. Cl. .......................................... F15b 11/08
[58] Field of Search ............ 137/83, 625.63, 625.64; 91/3

[56] References Cited
UNITED STATES PATENTS
2,960,995  11/1960  Hague .................................. 137/83
1,796,808  3/1931  Roberts ................................ 251/283
3,331,383  7/1967  Buchanan ............................. 137/83

*Primary Examiner*—Alan Cohan
*Attorney*—Richard K. Stevens

[57] ABSTRACT

In this free fluid jet servo-valve comprising a bored body, and a swivel nozzle for emitting a fluid jet, a device is provided for rotatably driving said nozzle and resilient means constantly urge this nozzle against rotation. At least one receiving nozzle has its inlet orifice registering with the outlet orifice of said emitter nozzle; the output in the receiving nozzle depending on the angular position of the emitter nozzle rigid with a cylindrical drum rotatably mounted in a bore formed in the valve body, a guide device provided with hydrostatic bearings of known type preventing any mechanical contact between said drum and the valve body bore.

10 Claims, 13 Drawing Figures

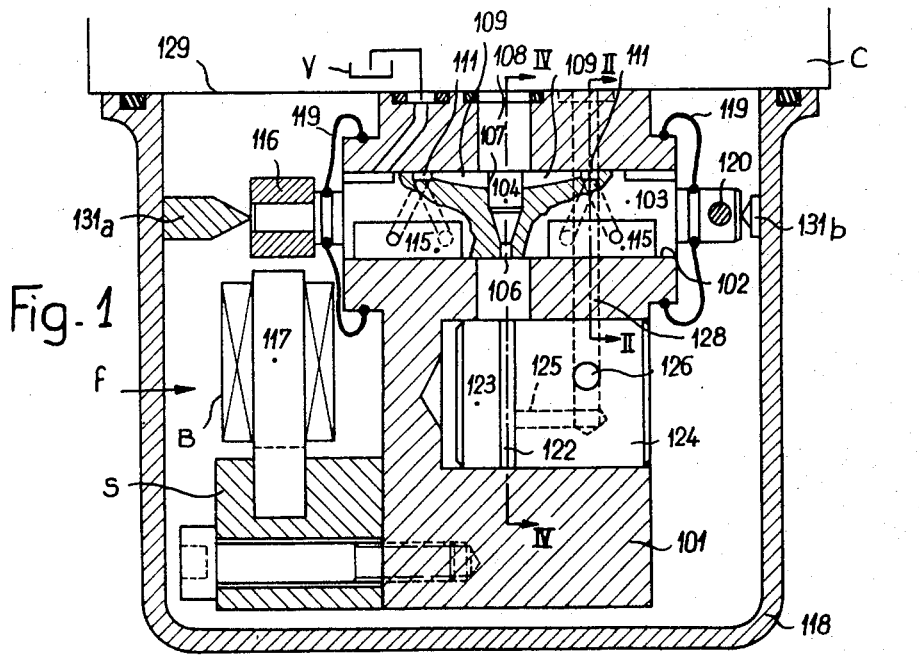
Fig. 1
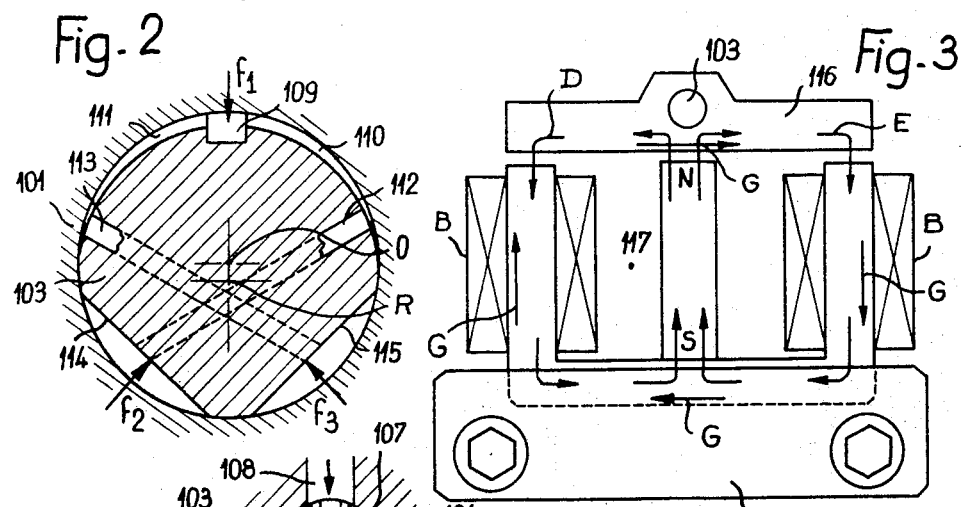
Fig. 2
Fig. 3
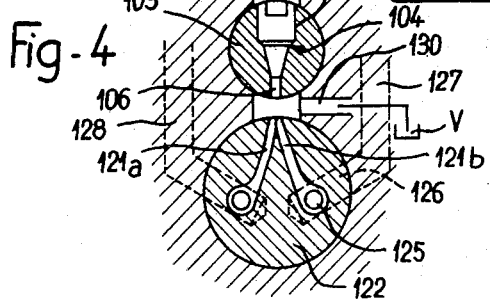
Fig. 4

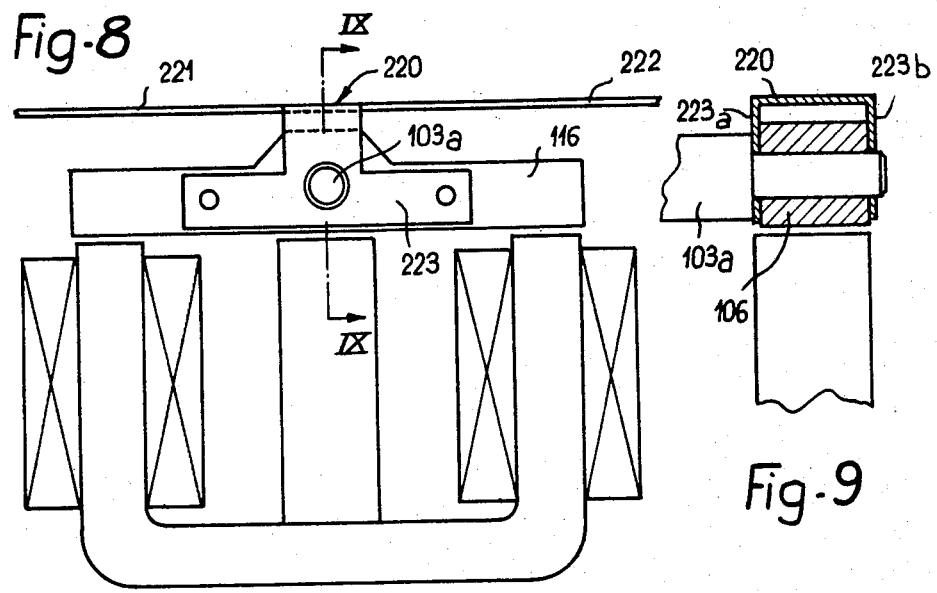
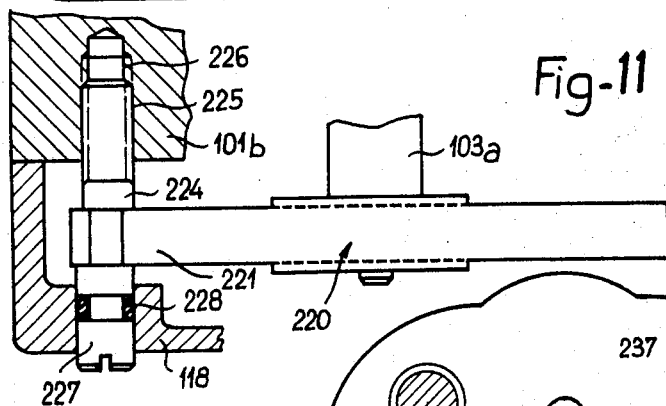
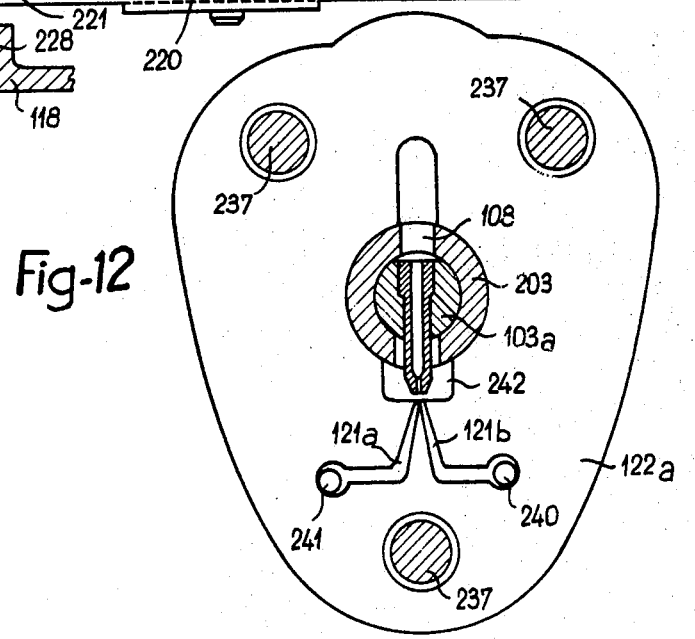

HYDRAULIC FREE-JET SERVO-VALVES

This invention relates in general to servo-valves and has specific reference to very quick response hydraulic servo-valves.

Servo-valves of this general character are widely used notably in the aircraft industry for controlling the device preventing the locking of the aircraft wheels or controlling the rudders and ailerons. In this case, the purpose of these servo-valves is to transform an electric signal into a fluid pressure or output with the shortest possible response time and the highest possible degree of precision.

Slide-type or spool-type servo-valves are already known wherein the fluid, as a consequence of the opening of a variable-section passage, is distributed among two chambers kept at different pressures.

The variation in the cross-sectional area of this passage is due to the relative movement of two members in mutual mechanical contact. Thus, rotary spool servo-valves and linear spool servo-valves have been developed.

However, servo-valves of this general type are gradually abandoned nowadays due to the high degree of precision required in the machining of their component elements, and also to the necessity of minimizing the operative clearance between the spool valve member proper and the valve body.

Due to the reduced play available and the sharp edges bounding the fluid passages these valves are particularly sensitive to the pollution of the hydraulic fluid. Besides, an increment both in leakages and plays is observed as a consequence of the gradual wearing out of the spool edges.

Finally, the considerable frictional contacts developed in these valves are accountable for the relatively high hysteresis of these servo-valves.

Servo-valves are also known wherein a torque motor actuates in a predetermined direction a vane movable between a pair of nozzles supplied with fluid under a relatively high pressure via a gauged throttled passage formed in the cylindrical body of each nozzle.

The internal volume of each nozzle is connected to the load pipe lines of the fluid.

In servo-valves of this type the distance between the end of each nozzle and the vane is small in relation to the diameter of the nozzle orifices.

If it is desired to keep the nozzle outputs at a relatively low value even when the pressure is high, throttled passages of extremely small diameter and therefore extremely reduced clearances, of the order of 0.02 to 0.03 mm, between the nozzles and vanes, must be used.

To permit the passage of the largest particles contained in the fluid between the nozzle and the vane when a minimum clearance is maintained, the fluid must be properly filtered.

Moreover, these particles thrown at high speed against the vane eventually damage its surface and therefore modify the servo-valve performances.

Swivel-jet valves are already known wherein the armature of a torque motor rotatably drives an oscillating nozzle through which the fluid is sprayed at high speed in the form of a jet divided and distributed among the two receiving orifices.

It is clear that a torque exerted on the armature of said torque motor will determine a movement of said jet; under these conditions, the receiving orifices will be supplied with unequal fluid outputs.

This valve can be operated with all fluids, even contaminated ones, and therefore the relatively large clearances admit relatively wide manufacturing tolerances.

However, this valve is attended by two essential inconveniences :
on the one hand, it requires the use of a flexion hose or pipe between the pivoting nozzle and the torque motor. Now, this hose is expensive and difficult to manufacture ;
on the other hand, a flexible linkage must be provided between the high-pressure fluid source or feed line and the swivel nozzle. In the case of a high-pressure supply this flexible connection is extremely difficult to achieve for it must nevertheless have a stiffness conformable to the reckoned value.

In addition, the inertia of the parts involved is relatively important; therefore, relatively high-powered torque motors must be used.

Valves wherein a deflector or baffle member rigid with the movable armature of the torque motor and formed with a flat end having a vertical slit are already known through the French Pat. No. 1,597,276. This slit is bounded along its vertical sides by flat, baffle-forming surfaces converging towards each other in the direction of flow of the fluid jet.

When this slit is travelling across a jet-emitting nozzle the fluid jet is deflected and thus a different fluid output is obtained in the receiving passages.

In valves of this last-described type the fluid jet exerts a reaction on the torque motor, mainly when the deflector angle is relatively wide.

On the other hand, due to the amplitude of this angle the impurity particles contained in the hydraulic fluid, for example oil, tend to erode the deflector and the latter must therefore be made from very hard, abrasion-resisting materials.

It is the essential object of this invention to provide a swivel-jet valve wherein :
the movable elements are subjected only to rotational movements,
the vis inertia of the movable or rotary component elements is extremely low,
the frictional contacts between the various parts are of negligible value, and
the torque motor is substantially insensitive to the fluid jet.

Considering these four characteristic features, a torque motor having a very low torque value may be used. Therefore, the over-all dimensions of this motor may be particularly reduced, and consequently with a given power consumption an extremely short response time can be obtained with a motor of this type.

It is another object of this invention to provide a servo-valve free of any flexible connection between the fluid pressure source and the jet-emitting nozzle.

Furthermore, this invention is directed to provide a servo-valve combining a relatively low manufacturing cost with high performances.

Basically, the servo-valve according to this invention comprises a bored valve body, a fluid-jet emitting swivel nozzle, means for rotatably driving said nozzle, other means for preventing the rotation of said jet emitting nozzle, a receiving nozzle having its orifice registering with the orifice of said emitter nozzle, the fluid output in said receiving nozzle depending on the angular position of said emitter nozzle. This servo-valve is characterised in that the emitter nozzle is rigid with a cylindrical drum rotatably mounted in the bore of said valve body, a guiding device of a hydrostatic-bearing type known per se for preventing a mechanical contact between said drum and said bore, an emitter-valve feed hole formed in said valve body and secant to said bore, whereby in any useful angular position of said drum said feed hole provides a pressure-fluid communication with said emitter nozzle.

According to a typical form of embodiment of this servo-valve, the drum supporting the emitter nozzle is balanced by two pairs of hydrostatic bearings disposed at either end of the drum and formed in the drum by hollow surfaces in relation to the outer surface of said drum. Each hydrostatic bearing is fed through a separate throttled passage constituting the feed pressure loss of each hydrostatic bearing.

The present invention is also concerned with a preferential form of embodiment of the feed pressure losses of the hydrostatic bearings of the drum supporting and centering the emitted nozzle.

It is a further object of this invention to provide means for axially adjusting the emitter nozzle supporting drum.

Moreover, this invention is concerned with preferential means for angularly adjusting the drum supporting the emitter nozzle.

Finally, the present invention is concerned with a specific form of embodiment of the means for returning the drum to its neutral position in case of failure of the servo-valve control current.

Other features and advantages of this invention will appear as the following description proceeds with reference to the accompanying drawing illustrating diagrammatically by way of examples typical forms of embodiment of the servo-valve of this invention. In the drawing :

FIG. 1 is a axial sectional view of the servo-valve according to this invention ;

FIG. 2 is a fragmentary section taken along the line II—II of FIG. 1 and showing a detail of the emitter nozzle support ;

FIG. 3 is a fragmentary end view of the servo-valve, as seen in the direction of the arrow $f$ of FIG. 1 ;

FIG. 4 is a fragmentary section taken along the line IV—IV of FIG. 1 ;

FIG. 8 is a fragmentary end view taken in the direction of the arrow F of FIG. 5, showing the servo-valve without its cover ;

FIG. 9 is a fragmentary section taken along the line IX—IX of FIG. 8 ;

FIG. 11 is a plan view from above of the servo-valve, as seen in the direction of the arrow F' of FIG. 10, with a fragmentary section taken along the line XI—XI of the same figure ;

FIG. 12 is a section taken along the line XII—XII of FIG. 8, showing on a larger scale members supporting the servo-valve nozzles.

Figure 5:
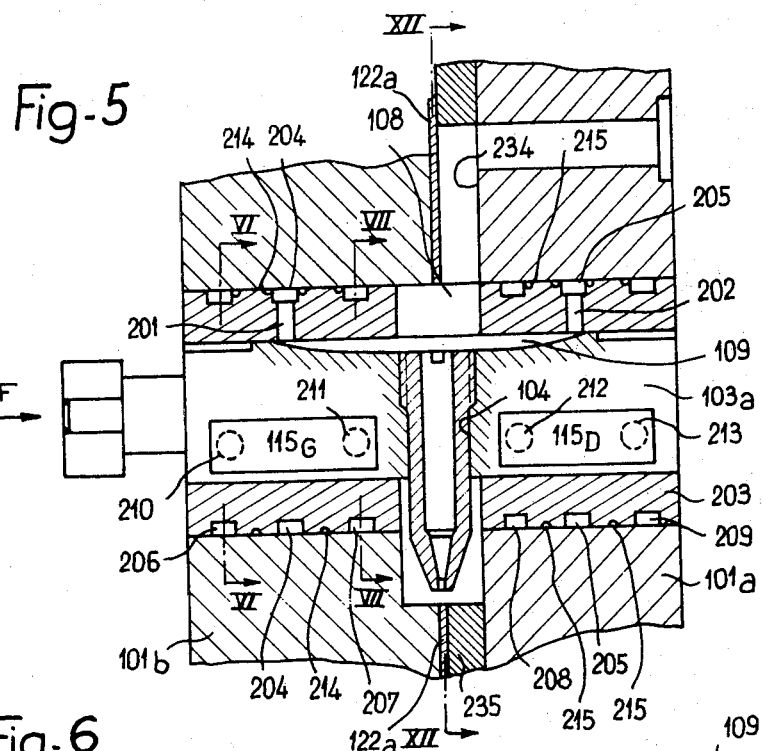
FIG. 5 is a fragmentary sectional view taken on a larger scale, of the servo-valve.
Figures 6, 7:
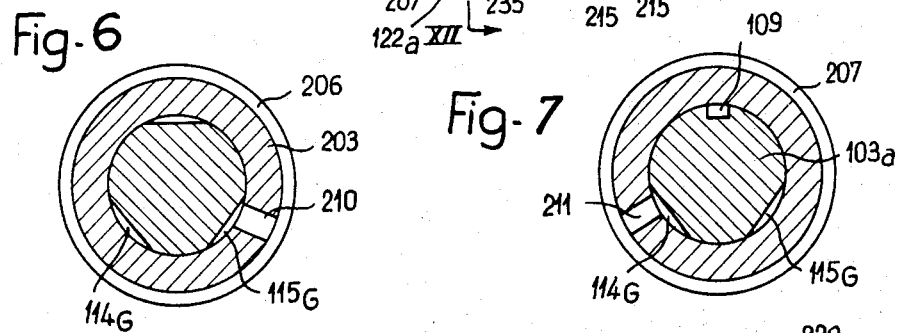
FIG. 6 is a section taken along the line VI—VI of FIG. 5, showing the emitter nozzle support on a larger scale.
FIG. 7 is a similar section taken along the line VII—VII of FIG. 5.

In the following description it is understood from the onset that the present invention comprises only the fluid jet generator, as well as the means for driving and guiding this jet generator and also control means responsive to the input signal, notably in case said last-named means are embodied in the form of a torque motor.

The servo-valve illustrated in FIG. 1 comprises a body 101 formed with a bore 102. A drum 103 is rotatably mounted in said bore 102. Formed diametrally in this drum 103 is the jet emitter 104 rotating bodily with the drum in said bore 102; however, it will be seen that this nozzle may also consist of an insert provided in said drum and extending outside this drum. The diameter of the outlet orifice 106 of the emitter nozzle corresponds to the diameter of the desired fluid jet (of the order of 0.2 mm to a few millimeters according to the specific applications contemplated). In order to obtain a nondiffusing jet as cylindrical as possible, the outlet orifice 106 of the emitter nozzle is relatively short and connected to the inlet orifice 107 of the emitter nozzle so that the speed gradient obtaining along said nozzle be substantially constant.

The emitter nozzle 104 registers with a feed hole 108 formed in the valve body 101. This feed hole 108 is supplied from the high-pressure source associated with the servo-valve.

When it is attempted to rotate the drum 103 while the hole 108 is exposed to a relatively high pressure, the frictional torque developed between the drum and the bore would be relatively high, for the fluid pressure would tend to press the drum against the bore surface.

To avoid this inconvenience, the fluid under pressure, preferably oil, flowing from the hole 108 is led by a longitudinal groove 109 formed in said drum to pressure-loss creating throttled passages formed for example by machining in either end of the valve drum 103. These throttled passages may consist for example of two grooves 110, 111 (one at each drum end) obtained by machining by rotating the drum about an axis of rotation R parallel to the drum axis O as illustrated in FIG. 2. Each groove 110, 111 is connected through a hole 112, 113 to two pairs of rotational surfaces 114 and 115 formed at either end of the drum and constituting hydrostatic bearings. As shown in FIG. 2, each hydrostatic bearing is angularly shifted in relation to the bearing of the same pair which is located at the same end of drum 103.

Thus, if said grooves 110 and 111 have been properly calculated and according to a well-known mode of operation of hydrostatic bearings, the drum 103 will be in a state of equilibrium under the influence of force $f_1$ due to the fluid supply pressure and to the two forces $f_2$ and $f_3$ exerted at each end of said drum. Thus, no mechanical contact is produced between the drum 103 and the surface of bore 102.

As shown in FIGS. 1 and 3, the movable armature 116 of the torque motor 117 is rigid with said drum 103. This torque motor may be of any known and suitable type. The torque illustrated is of the so-called "E I" type and comprises a pair of coil windings B surrounding each arm of the fixed armature. A permanent magnet N-S provides a biasing field of which the lines of force are closed or looped as shown by the arrows D and E.

When electric current is supplied to the windings B they provide a magnetic field of which the lines of force are shown by the arrows G. According to the well known principle, the movable armature 116 of the torque motor is then subjected to a torque proportional to the current flowing in windings B. Therefore, this torque is transmitted to the drum 103. The fixed armature of the torque motor is mounted to the body 101 of the servo-valve through the medium of a non-magnetic support T.

The assembly is isolated from the external atmosphere by a cover 118 in fluid-tight engagement with the block C to which the servo-valve body 101 is connected. The torque motor illustrated is immersed in oil and separated by flexible diaphragms 119 from the hydraulic fluid proper of the servo-valve. Thus, the coil windings of the torque motor are properly cooled while preventing magnetic particles from being entrained by the hydraulic fluid and interfering with its operation. According to a typical feature characterising this device, the flexible diaphragms 119 are torsion stressed and constitute sleeve members connected with one edge to the valve body 101 and with the other edge to the drum 103, this last connection lying between the movable armature 116 and the aforesaid valve body 101.

When the torque motor 117 is de-energized it is urged to a well-defined angular position by a resilient element 120. This resilient element 120 may consist for instance of a flexible steel rod having its ends rigid with the drum 103 and valve body 101, so that by properly adjusting positioning stops associated with the rod 120 on said body 101 it is possible to vary at will the direction or angular position of the emitter nozzle 104. When no current is applied to the torque motor, the jet issuing from the nozzle 104 can be adjusted in a manner causing said jet to be distributed in equal proportions among the pair of receiving nozzles 121a and 121b illustrated in FIG. 4. These two receiving nozzles are machined in a washer 122 secured between a cover 123 and a body 124 in which axial and radial oil outlet orifices 125 and 126 respectively are machined, these rifices communicating with passages 127 and 128 respectively formed in the valve body 101 and being adapted to be connected to the load or controlled members on the face 129 of block C. The gap left between the emitter nozzle 104 and the pair of registering receiving nozzles 121a and 121b is connected via a passage 130 to the reservoir shown in diagrammatic form at V in FIG. 4. The various fluid connections are shown only diagrammatically since their practical forms of embodiment are well known; all these connections are directed to the face 129 of block C as shown in FIG. 1.

When the torque motor is energized the drum 103 carrying the emitter nozzle 104 revolves and the fluid jet is thus distributed unequally among the receiving nozzles 121a and 121b. When the maximum torque is attained by this motor 117 only one of the receiving nozzles, 121a or 121b, receives the fluid jet while the other receiving nozzle is connected to the reservoir under pressure via a passage 130. It will be seen that the thickness of washer 122 should be very close to the jet diameter. To meet this requirement, the nozzles 104, 121a and 121b are positioned in proper mutual relationship by means of adjustable axial abutment members 131a and 131b associated with the drum 103, as shown diagrammatically in FIG. 1.

The jet-receiving nozzles 121a and 121b (which, from a constructional point of view, are no part of this invention) may also be obtained by drilling suitable orifices in an insert or member subsequently rendered hard and abrasion-resistant by a suitable treatment.

The above description clearly shows that this invention provides a swivel jet emitter assembly of moderate over-all dimensions (the drum, in the first stage of the servo-valve, may be as small as 5 mm in diameter and 15 mm in length), of reduced inertia and free of frictional contacts. Under these conditions, it is clear that the fluid jet cannot have any detrimental influence on the torque motor; therefore, this motor may also have very reduced dimensions and be of simple construction.

It may also be emphasized that the device according to this invention can be operated with any known and suitable type of torque motor, and also with any known and suitable means for resiliently returning the jet generator, without departing from the basic principle and scope of the invention.

Similarly, anyone skilled in the art may easily operate the valve device of this invention by means of a dry torque motor or, alternatively, by means of an immersed torque motor in fluid communication with the input pressure of the servo-valve.

A typical form of embodiment of hydrostatic bearings (in fact, four independent bearings) with their supply circuits or passages has been illustrated. However, it will readily occur to those conversant with the art that other forms of embodiment may be devised, for example those comprising throttled passages and hydrostatic bearings, without departing from the scope of the invention.

In the modified form of embodiment illustrated diagrammatically in FIGS. 5 to 12 of the drawing the losses of supply pressure in the fluid feed directed to the hydrostatic bearings 114 and 115 (with the complementary reference letter D or G according as the bearings are disposed on the right or on the left, respectively, with respect to the axis of the receiving nozzle illustrated in FIG. 5), are obtained as follows:

The drum 103a provided with these bearings is mounted in a cylinder or sleeve 203 of which the diametral orifice 108 supplied from the high-pressure fluid source registers with the jet emitter nozzle 104 and directs the fluid under pressure into a longitudinally milled groove 109. This groove 109 supplies a pair of radial holes 201, 202 formed through the wall of cylinder 203. This cylinder is force-fitted or mounted with a very reduced clearance in the two-section body 101a, 101b of the valve.

These radial holes 201 and 202 open into a first set of annular grooves 204 and 205, respectively, machined in the outer surface of cylinder 203. The width of groove 109 is such that these holes 201 and 202 are constantly supplied with high-pressure fluid during the complete useful rotation of drum 103a.

A second set of annular grooves 206, 207 and 208, 209 are machined in the outer surface of cylinder 203 and disposed on either side, respectively, of the grooves 204 and 205, as shown in FIG. 5.

Groove 206 is connected via a radial passage 210 formed in cylinder 203 to the cavity 115G of the hydrostatic bearing located at the left-hand end of the drum, as seen in FIG. 5. Groove 207 is connected via a radial passage 211 to the cavity 114G of the hydrostatic bearing also located at the left-hand end of the drum 103a and shifted angularly in relation to the aforesaid hydrostatic bearing 115G.

Orifices 212 and 213 are provided for interconnecting in a similar manner the grooves 208, 209 and the cavities 114D, 115D, respectively, of the hydrostatic bearings located at the right-hand end of drum 103a.

Finally, the groove 204 of the first set is connected to the grooves 206 and 207 of the second set through a screw-thread 214 formed in the outer surface of cylinder 203; likewise, the groove 205 of the first set is connected to the grooves 208 and 209 of the second set through a screw-thread 215 also formed externally of cylinder 203.

Each one of these screw-threads 214, 215 is separated into two screw-thread elements of same length, respectively, by said grooves 204 and 205. Each one of these screw-thread elements constitutes a separate source of pressure losses for each one of the bearings formed by their cavities 114G, 115G and 115G, 115D.

The main advantage resulting from this arrangement is that the losses of pressure thus obtained are relatively long and, thus, their cross-sectional areas may be relatively large, so that any risk of clogging them with the impurities carried by the fluid under pressure is safely avoided.

As shown in FIG. 8, the armature 116 of the torque motor is rigidly connected to the central portion of a spring blade 220 comprising two lateral sections or wings 221, 222 and a strap-shaped central portion 223 secured to the torque motor armature 116.

This central portion 223 of spring 220 comprises lateral lugs 223a, 223b disposed on either side of the armature 116. These lugs 223a, 223b and the movable armature 116 are rotatably solid with an extension of drum 103a. The relative rotation of these members 116, 223 with respect to the drum 103a is prevented through any suitable means, such as riveting, cementing, etc... The spring 220 consists preferably of non-magnetic resilient material such as beryllium bronze.

The manner in which this spring 220 permits of adjusting the nozzle-supporting drum 103a both angularly and axially will be explained presently.

The end of wing 221 of spring 220 abuts a cylindrical adjustment member 224 having its axis parallel to the axis of drum 103a. One end of this adjustment member 224 comprises a screw-threaded portion 225 screwed in a tapped hole 226 formed in the valve body 101b. The other end of this member 224 comprises a cylindrical portion 227 extending in a fluid-tight manner through the valve cover 118, due to the interposition of a suitable gasket 228. The cylindrical portion 227 is shaped to permit the engagement of a suitable tool, for example a screwdriver, for rotating same. The portion of member 224 acting as a stop to wing 221 of spring 220 consists of the bottom of a groove equal in width to the aforesaid wing 221 of spring 220. Thus, any rotation of member 224 will be attended by an axial movement thereof due to the presence of said screw-thread 225 and therefore by a movement of said spring 220 and also of drum 103a along its axis.

Thus, a device for adjusting the axial position of drum 103a supporting the jet emitter nozzle is obtained.

Since the adjustment member 224 is solid with the valve body 101b, a preliminary adjustment of the bare valve, i.e. without its cover, may be effected. Furthermore, it is also possible to make the final adjustment after having positioned the cover on the valve.

Figure 10:
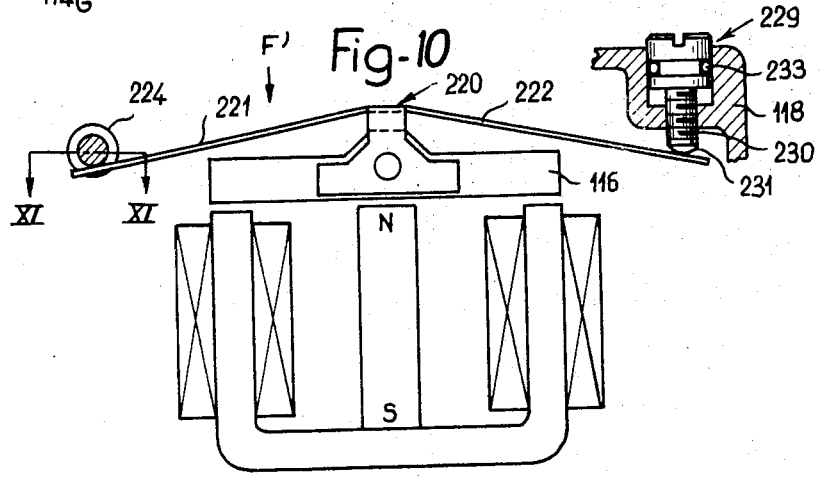
FIG. 10 is a fragmentary end view of the servo-valve according to the arrangement of FIG. 8, but incorporating the servo-valve cover.

The end of the other wing 222 of spring 220 engages an adjustable stop 229 (FIG. 10). This stop 229 comprises a screw-threaded portion 230 with a rounded tip 231 and is screwed in the cover 118 of the servo-valve. The stop 229 further comprises a screw head of a greater diameter than its shank and is provided with a sealing gasket 233 for preventing any leakage of fluid through the cover 118. The stop 229 is thus accessible from outside when the servo-valve is closed by its cover.

Thus, when the stop 229 is rotated the angular position of drum 103a and consequently the angular position of the jet emitter nozzle, as well as the jet distribution among the receiving nozzles, can be modified at will.

This drum adjustment is permitted by the fact that the wing 221 of spring 220 is held against rotation in relation to the axis of drum 103a.

To keep the relative movements between each spring wing 221, 222 and the relevant stops to negligible values during the drum rotation, the line connecting the point of contact between wing 221 of spring 220 and stop 224 to the point of contact between the spherical tip 231 of stop 229 and the wing 222 of spring 220 must substantially include the drum axis.

The prestress exerted by the stops 224 and 229 on spring 220 must be such that for any useful angular position of armature 116 of the torque motor the bearing force between the spring 220 and its stop members cannot be cancelled under any circumstance. In practice this requirement is met by bending the spring 220 from the shape shown in FIG. 8 to the shape shown in FIG. 10, with the assistance of its stops.

From the foregoing it is clear that the return spring 220 associated with the armature 116 of the torque motor permits an axial adjustment as well as an angular adjustment of the jet emitter nozzle.

By way of example, the cylinder 203 is force-fitted in a portion 101a of the valve body, which has a certain thickness along the axis of drum 103a, so that the jet emitter nozzle 104 can be unscrewed and extracted from said cylinder 203 without interfering with said body portion 101a.

The face 234 of the body portion 101a is flat.

A lapped plate 235 having flat faces bears with one of these faces against the above-mentioned face 234. The other face of plate 235 receives a thin plate 122a of a thickness corresponding substantially to the diameter of the fluid jet emitted by the nozzle 104.

This plate 122a is machined to form the jet-receiving nozzles 121a and 121b (see FIG. 12). Finally, the other portion 101b of the valve body is caused to bear against the plate 122a and all these elements 101b, 122a, 235 and 101a are clamped together by means of screws 237.

The cylinder 203 is mounted perpendicularly with a very moderate or zero clearance in plate 235 and also in the thin plate 122a, in order to minimize the leakages between the high-pressure fluid inlet chamber 108 and chamber 242 in which the low pressure prevails. The receiving nozzles 121a and 121b are cut in plate 122a and connected to the pair of load orifices 240 and 241 through holes machines or drilled in portions 101a and 101b. The plate 122a may be obtained by chemical cutting. The receiving nozzles 121a, 121b are separated by a wedge-shaped plate portion having its acute angle directed towards the emitted nozzle.

Figure 13:
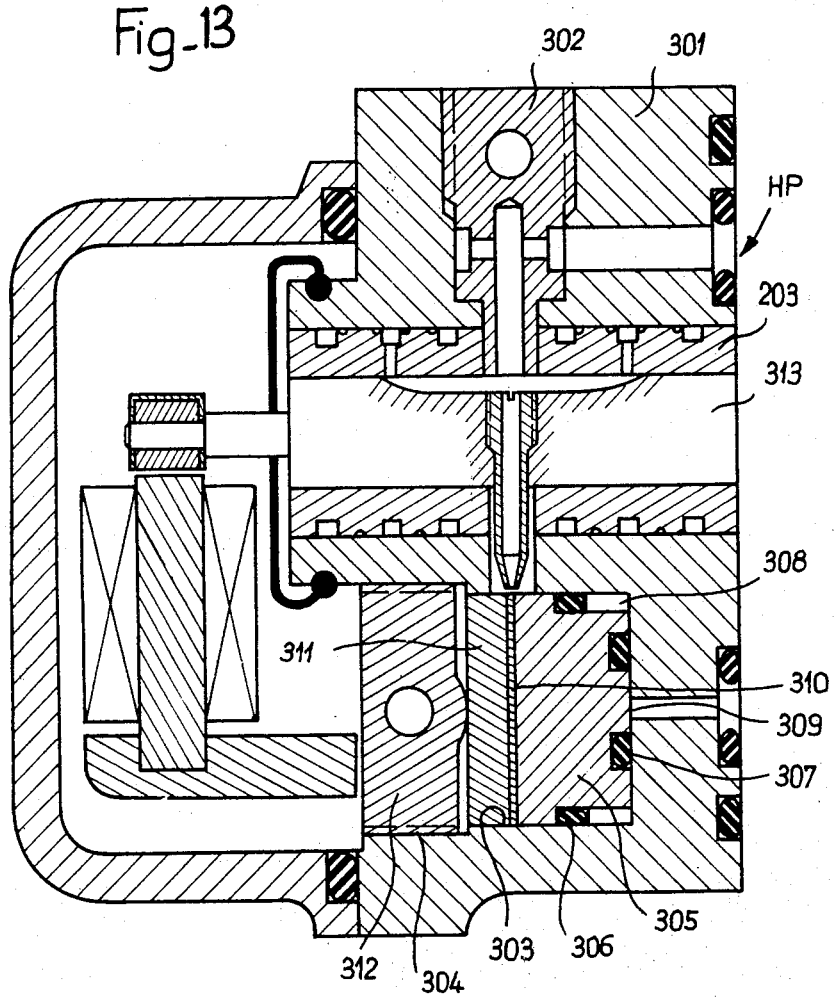
FIG. 13 is a sectional view of a modified form of embodiment of the servo-valve of this invention.

According to another form of embodiment the valve body illustrated in FIG. 13 may consist of a one-piece block 301 and the cylinder 203 may be fitted tightly or with the minimum play. In this case, a screw plug 302 will lock the cylinder 203 in position while permitting the supply of high-pressure fluid (through inlet port HP) to the emitter nozzle.

A blind hole 303 having a tapped inlet portion is formed in the body 301. In the hole 303 a member 305 provided with O-ring seals 306 and 307 forms two chambers 308, 309 hydraulically isolated from each other and connected to one of the receiving nozzles and to a load orifice or port, respectively.

A thin plate 310 in which the receiving nozzles are etched in a known manner is disposed on member 305 and pressed in a fluid-tight manner thereagainst by means of a counter-plate 311 pressed in turn by a screw plug 312 sealing the hole 303.

The nozzle-supporting drum 313 is adjustably mounted as already described hereinabove with reference to the drum 103a.

The servo-valve according to this invention may be used as a monitoring device with the multi-stage servo-valve. A torque motor is illustrated as constituting the input member of the servo-valve. Of course, any other type of input member, whether mechanical, pneumatic or other, may be used without departing from the basic principle of the invention.

The commercial applications of the servo-valve according to this invention are the same as those of hitherto known servo-valves.

These servo-valves are particalarly useful in hydraulic servo-action systems, notably for controlling machine tools, braking systems and aircrafts rudders and ailerons. Due to the moderate manufacturing cost of the servo-valve of this invention, this device is also applicable to advantage in the automotive industry, notably in devices for preventing the wheels from skidding in braking systems, or when it is desired to modulate the control pressure of automatic gearbox clutches or synchromesh devices.

What is claimed as new is :

1. Free fluid jet servo-valve comprising a bored body, a jet-emitting swivel nozzle, means for rotatably driving said emitter nozzle, other means for resiliently counteracting the nozzle rotation, at least one receiving nozzle having its orifice registering with the orifice of said emitter nozzle, the fluid output in the receiving nozzle depending on the angular position of said emitter nozzle, said emitter nozzle being rigid with a cylindrical drum rotatably mounted in a bore formed in the valve body, hydrostatic bearings between said drum and the bore formed in the valve body, an orifice for supplying hydraulic fluid to said emitter nozzle, being formed in said valve body, the axis of said orifice being substantially perpendicular to the axis of said drum bore in the intermediate portion of said bore axis, and said drum being balanced by two pairs of hydrostatic bearings, each pair being disposed at one end of said drum, each bearing being angularly shifted in relation to the bearing of the same pair and formed in said drum by hollow surfaces recessed from the outer surface of said drum, and separate throttled passages being provided to supply each bearing from said supply orifice.

2. Servo-valve according to claim 1 wherein said drum supporting the emitter nozzle is rigid with the movable armature of a torque motor.

3. Servo-valve according to claim 2, wherein said torque motor is immersed in a fluid separated from the servo-valve fluid proper by flexible walls secured through a first connection with said valve body and through a second connection with the drum proper, said second connection being disposed between the movable armature of said torque motor and said valve body.

4. Servo-valve according to claim 1, wherein the throttled passages provided for supplying fluid to said hydrostatic bearings consist of screw-threads machined in the outer surface of said drum on either side of a first set of grooves into which said screw-threads are caused to open, said grooves being machined on the outer surface of said drum and connected to said supply orifice, said screw-thread opening on the other hand into another set of grooves machined in the outer surface of said drum, the two grooves associated with the two hydrostatic bearings of a same pair being disposed symmetrically in relation to the groove of the first set, each groove of the other set being connected to one of the hydrostatic bearings through radial passages, respectively, formed in said drum.

5. Servo-valve according to claim 1, wherein the resilient means counteracting the rotation of the emitter nozzle comprise a blade spring disposed substantially at right angles to the drum axis and rigidly secured intermediate its ends to the movable armature of a torque motor.

6. Servo-valve according to claim 5, wherein the two ends of said spring are bearing against first and second stops, the first stop of said spring being movable in a direction parallel to the drum axis in conjunction with the end of said blade spring, whereby a given axial position of said drum corresponds to any position of said stop.

7. Servo-valve according to claim 5, wherein the two ends of said spring are bearing against first and second stops, said first and second stops comprising two members having screw-threaded portions permitting the adjustment of their position, said member extending in a fluid-tight manner the cover of the servo-valve and comprising external adjustment means.

8. Servo-valve according to claim 4, wherein the valve body comprises at least two elements clamped together on either side of a relatively thin plate having a thickness corresponding substantially to the diameter of the jet emitted from said jet emitter nozzle, said thin plate being cut to form a wedge portion having its acute angle directed towards said emitter nozzle, each receiving nozzle being connected by suitably machined portions of one or the other portions of said valve body to the ports connected in turn to the means utilizing said valve, said thin plate receiving therethrough with a very reduced clearance a cylinder guiding said drum of which the axis is perpendicular to the surface of said plate, whereby the jet emitted from the drum nozzle lies constantly in the plane of said plate irrespective of the angular position of said drum.

9. Servo-valve according to claim 8, wherein between said thin plate and at least one of the portions constituting the servo-valve body another plate is disposed for permitting the easy disassembling of the emitter nozzle forming an insert in said drum, without having to remove the cylinder from said body.

10. Servo-valve according to claim 4, wherein the valve body is receiving a guide cylinder for said drum and comprises a blind hole having its axis parallel to the drum axis, a thin plate located in the plane of the fluid jet emitted by said emitter nozzle carrying the jet receiving nozzles separated by a wedge-shaped portion having its acute angle directed towards said jet, said thin plate being axially clamped between two members centered in said blind hole, one of these two members being disposed in the bottom of said blind hole and provided with sealing O-rings so as to form with the bottom of said blind hole a pair of chambers hydraulically isolated from each other and connected through passages to one of the receiving nozzles, on the one hand, and to a load orifice formed in the servo-valve body, on the other hand.

* * * * *